(12) United States Patent
Lee et al.

(10) Patent No.: US 11,378,470 B2
(45) Date of Patent: Jul. 5, 2022

(54) ELECTRONIC DEVICE WITH FORCE-SENSING APPARATUS

(71) Applicant: Samsung Electro-Mechanics Co., Ltd., Suwon-si (KR)

(72) Inventors: Chang Ju Lee, Suwon-si (KR); Nam Gyun Yim, Suwon-si (KR); Sol Ji Chang, Suwon-si (KR); Hong Seok Lee, Suwon-si (KR); Hee Sun Oh, Suwon-si (KR); Gye Won Lee, Suwon-si (KR); Seung Pil Jung, Suwon-si (KR); Jong Yun Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 16/999,467

(22) Filed: Aug. 21, 2020

(65) Prior Publication Data

US 2021/0262870 A1 Aug. 26, 2021

(30) Foreign Application Priority Data

Feb. 24, 2020 (KR) .......................... 10-2020-0022499

(51) Int. Cl.
*G01L 1/04* (2006.01)
*G01L 5/00* (2006.01)

(52) U.S. Cl.
CPC .............. *G01L 1/04* (2013.01); *G01L 5/0038* (2013.01)

(58) Field of Classification Search
CPC ........ G06F 3/0414; G01L 1/04; G01L 5/0038
USPC ....................................... 73/862.621
See application file for complete search history.

(56) References Cited

U.S. PATENT DOCUMENTS

| 7,183,948 | B2* | 2/2007 | Roberts .............. G06F 3/04142 |
| | | | 341/34 |
| 2003/0222660 | A1* | 12/2003 | Morimoto ............... G01L 5/223 |
| | | | 324/661 |
| 2005/0252303 | A1 | 11/2005 | Taniguehi |
| 2008/0202824 | A1* | 8/2008 | Philipp .................. G06F 3/044 |
| | | | 178/18.01 |
| 2015/0362389 | A1* | 12/2015 | Yanev ...................... G01L 1/26 |
| | | | 73/862.041 |
| 2017/0241827 | A1 | 8/2017 | Heo et al. |
| 2018/0157353 | A1* | 6/2018 | Sleeman .............. H03K 17/975 |
| 2021/0239543 | A1* | 8/2021 | Yim ........................ G01L 1/04 |

FOREIGN PATENT DOCUMENTS

| JP | 4514509 B2 | 7/2010 |
| KR | 10-1804297 B1 | 12/2017 |

* cited by examiner

*Primary Examiner* — Octavia Davis Hollington
(74) *Attorney, Agent, or Firm* — NSIP Law

(57) ABSTRACT

An electronic device includes a force-sensing apparatus. The force-sensing apparatus includes a planar-shaped frame, a force sensor, and a displacement portion. The force sensor is disposed on one surface of the frame. The displacement portion has a planar profile and one side coupled at an acute angle to the frame and another side freely disposed above a sensing surface of the force sensor.

20 Claims, 4 Drawing Sheets

ELECTRONIC DEVICE WITH FORCE-SENSING APPARATUS

CROSS-REFERENCE TO RELATED APPLICATION(S)

This application claims benefit under 35 USC 119(a) of Korean Patent Application No. 10-2020-0022499 filed on Feb. 24, 2020 in the Korean Intellectual Property Office, the entire disclosure of which is incorporated herein by reference for all purposes.

BACKGROUND

1. Field

The present disclosure relates to an electronic device with a force-sensing apparatus.

2. Description of Related Art

Portable terminals such as notebook PCs, smartphones, and smartpads are basically equipped with a display and input means for providing information to a user.

In order to improve design and performance such as waterproofing and dustproofing of such portable terminals, technologies using a force-sensing apparatus as an input means instead of a conventional mechanical button have been researched.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a force-sensing apparatus includes a planar-shaped frame, a force sensor, and a displacement portion. The force sensor is disposed on one surface of the frame. The displacement portion has a planar profile and one side coupled at an acute angle to the frame and another side freely disposed above a sensing surface of the force sensor.

The frame and the force sensor may be bowed and deformed by pressure applied externally.

In the displacement portion, a portion of the one surface of the frame may contact the force sensor.

The displacement portion may maintain a state in contact with the force sensor through restorative force caused by resilient deformation.

The displacement portion may contact an edge of the sensing surface of the force sensor.

The force-sensing apparatus of may further include a circuit board disposed on the one surface of the frame. Each of a plurality of force sensors may be disposed to be spaced apart and mounted on the circuit board.

The force-sensing apparatus may be included a mobile device.

In another general aspect, an electronic device includes a receiving member having a first sidewall and a second sidewall disposed to face the first sidewall, and a force-sensing apparatus inserted into the receiving member. The force-sensing apparatus includes a frame having one surface bonded to the first sidewall, a force sensor disposed on another surface of the frame, and a displacement portion connected to the frame, and, having a portion thereof disposed above a sensing surface of the force sensor. The frame and the first sidewall are configured to resiliently deform based on applied external pressure.

The electronic device may further include an adhesive member disposed between the frame and the first sidewall.

One side of the displacement portion may be connected at an acute angle to the frame and the portion disposed above the sensing surface contacts the force sensor. The force-sensing apparatus may be disposed to be spaced apart from the second sidewall.

The force-sensing apparatus may further include a resilient member disposed between the second sidewall and the frame, and biasing the frame toward the first sidewall.

The electronic device may be a mobile device.

In another general aspect, a force-sensing apparatus includes a frame formed of a planer-shaped member, a force sensor disposed on a surface of the frame, a displacement portion having a portion disposed above a sensing surface of the force sensor, and a button member disposed on the surface of the frame. A vertical distance from an outer surface of the frame to an outer surface of the button member is equal to or greater than a vertical distance from the outer surface of the frame to the outer surface of the displacement portion.

The displacement portion may be resiliently deformed by external pressure.

The displacement portion may be disposed in parallel with the frame.

The force-sensing apparatus may further include a support portion connecting the displacement portion and the frame.

The displacement portion may include a protruding portion protruding toward the force sensor.

The force-sensing apparatus may be included in a mobile device.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
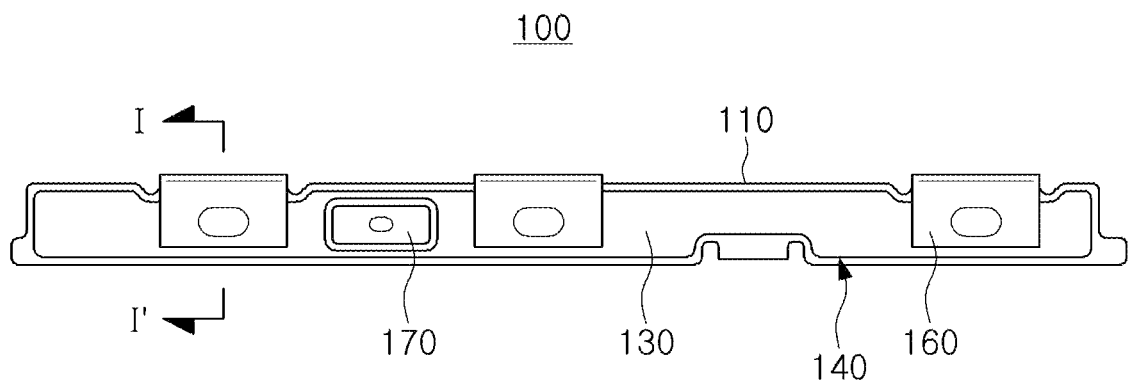
FIG. 1 is a front view of a force-sensing apparatus according to an embodiment of the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of the disclosure of this application. Further, although the examples described herein have a variety of configurations, other configurations are possible as will be apparent after an understanding of the disclosure of this application.

As a non-exhaustive example only, a device or an electronic device as described herein may be a mobile device, such as a cellular phone, a smart phone, a wearable smart device (such as a ring, a watch, a pair of glasses, a bracelet, an ankle bracelet, a belt, a necklace, an earring, a headband, a helmet, or a device embedded in clothing), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device configured to perform wireless or network communication. In one example, a wearable device is a device that is designed to be mountable directly on the body of the user, such as a pair of glasses or a bracelet. In another example, a wearable device is any device that is mounted on the body of the user using an attaching device, such as a smart phone or a tablet attached to the arm of a user using an armband, or hung around the neck of the user using a lanyard.

Figure 2:
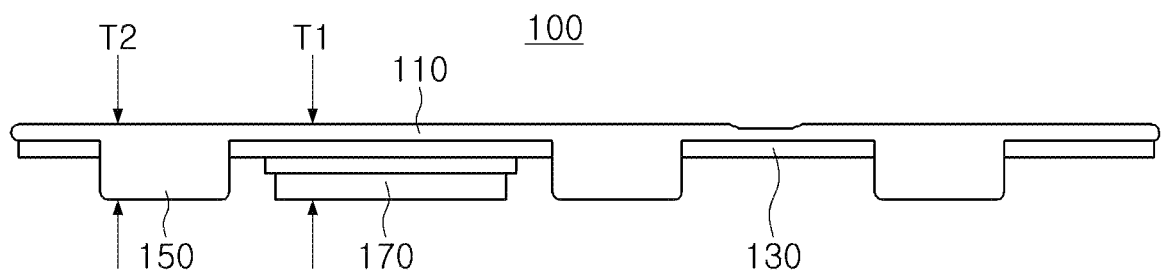
FIG. 2 is a top view of the force-sensing apparatus shown in FIG. 1.

FIG. 1 is a front view of a force-sensing apparatus according to an embodiment of the present disclosure. FIG. 2 is a top view of the force-sensing apparatus shown in FIG. 1, and FIG. 3 is a cross-sectional view taken along line I-I' of FIG. 1.

Figure 3:
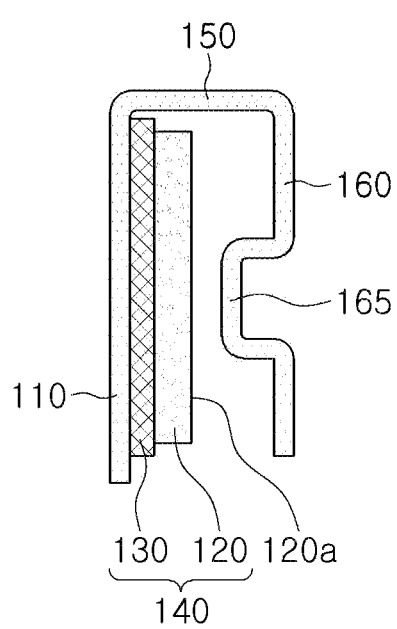
FIG. 3 is a cross-sectional view taken along line I-I' of FIG. 1.

Referring to FIGS. 1 to 3, a force-sensing apparatus 100, according to the present embodiment, is configured to include a sensor unit 140, a frame 110, and a displacement portion 160.

The sensor unit 140 may include, at least, one force sensor 120 and a connection unit 130 electrically connecting an electronic device on which the force-sensing apparatus 100 is mounted.

A circuit board, such as FPCB or PCB, may be used as the connection unit 130.

A plurality of force sensors 120 may be disposed to be spaced apart and mounted on the connection unit 130.

The force-sensing apparatus 100, according to the present embodiment, may be provided with a force sensor 120 using a sensing coil. In an example, the force sensor 120 may be a sensor detecting a change in distance between the sensing coil and the displacement portion 160.

The shape of the sensing coil is not particularly defined, and a coil pattern may be formed in various shapes like a circle or a square. In addition, the sensing coil may be formed in the form of a wiring pattern on a PCB or an FPCB, or the sensing coil may be configured to have a form of a chip inductor.

The force sensor 120 may detect the deformation of a case upon a user pressing the case (for example, a metal case) of the electronic device. In an example, when the user presses the case, the case is bowed, and a displacement portion described later is deformed to change the distance between a resonance sensing coil and the displacement portion, which is a conductive object.

Due to the change in distance described above, the magnitude of an eddy current generated in the displacement portion 160 changes, and accordingly, a change occurs in the inductance of the sensing coil. Accordingly, the force-sensing apparatus 100 may detect a change in pressure based on a change in inductance described above and recognize the change as an input signal.

The frame 110 is a member supporting the sensor portion 140, and may be formed of a flat plate-shaped member. Therefore, the frame 110 may be provided with a first surface and a second surface, opposite to the first surface, and at least one force sensor 120 being disposed on the first surface of the frame.

In the present embodiment, the connection portion 130 is formed of a circuit board and is disposed entirely on one surface of the frame 110. The plurality of force sensors 120 are disposed to be spaced apart on the connection portion 130.

The frame 110 may be formed of a metal material, but is not limited thereto.

The displacement portion 160 is formed in a plate shape, and is disposed to be spaced apart from a predetermined distance, and disposed to cover at least a portion of a sensing surface 120a of the force sensor 120. Therefore, all or part of the force sensors 120 of the present embodiment may be disposed between the frame 110 and the displacement portion 160.

In an example, the displacement portion 160 of the present embodiment is disposed in front of the sensing surface 120a such that at least a portion thereof faces the sensing surface 120a of the force sensor 120, and maintains a spacing distance frame the frame 110 through the support portion 150.

In the present embodiment, the displacement portion 160 is disposed in parallel to the sensing surface 120a of the force sensor 120, but is not limited thereto.

One side of the support portion 150 is connected to the frame 110, and the other side thereof is connected to the displacement portion 160 to connect the frame 110 and the displacement portion 160.

In the present embodiment, the displacement portion 160 and the support portion 150 may be integrally formed with the frame 110. For example, a material constituting the frame 110 may be partially bent to form the support portion 150 and the displacement portion 160.

Therefore, the support portion 150 and the displacement portion 160 may be formed of a flat plate-shaped member, similar to that of the frame 110. However, the configuration of the present disclosure is not limited thereto, and various modifications are possible, such as providing the support portion 150 and the displacement portion 160 separately, respectively, and then combining them with each other to integrally configure the frame 110.

Since only one side of the displacement portion 160 is connected to the support portion 150, the displacement portion 160 extends from the support portion 150 in the form of a cantilever. Therefore, when the displacement portion 160 is pressed toward the force sensor 120 by an external pressure, the displacement portion 160 is resiliently deformed by rotating about a portion connected to the support unit 150.

The displacement portion 160 may be provided with at least one protruding portion 165. The protruding portion 165 may be formed in a protrusion shape protruding toward the force sensor 120. The protruding portion 165 may be provided to minimize a distance between the displacement portion 160 and the force sensor 120. Accordingly, the protruding portion 165 may be formed to protrude in a range that does not contact the force sensor 120 when the displacement portion 160 is deformed.

The protruding portion 165 may be formed by pressing the displacement portion 160, but is not limited thereto.

Meanwhile, as described above, the force sensor 120 senses an input signal based on a change in distance from a pressing surface (for example, a case of an electronic device) to which a user applies pressure, so that sensing sensitivity improves as the distance change increases. Therefore, the force-sensing apparatus 100 of the present embodiment is provided with a displacement portion 160 to amplify the above-described change in distance.

Figure 4:
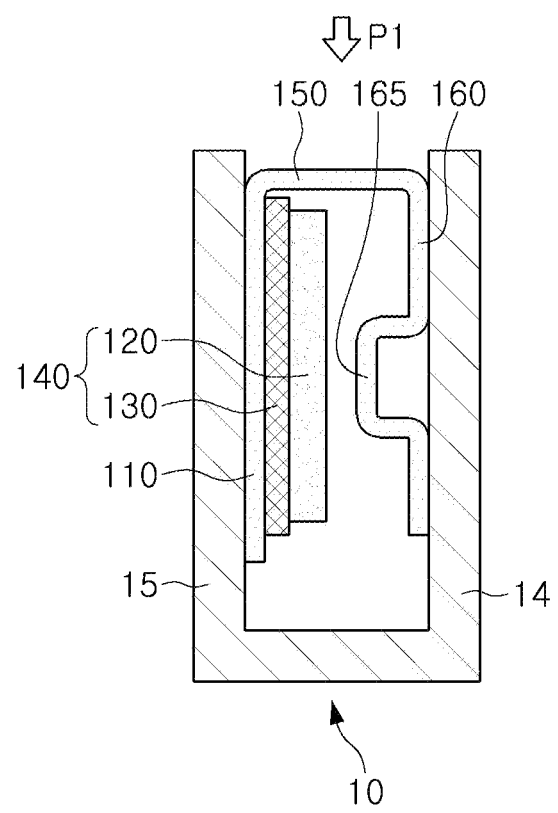
FIG. 4 is a cross-sectional view of an electronic device equipped with the force-sensing apparatus of FIG. 3.
Figure 5:
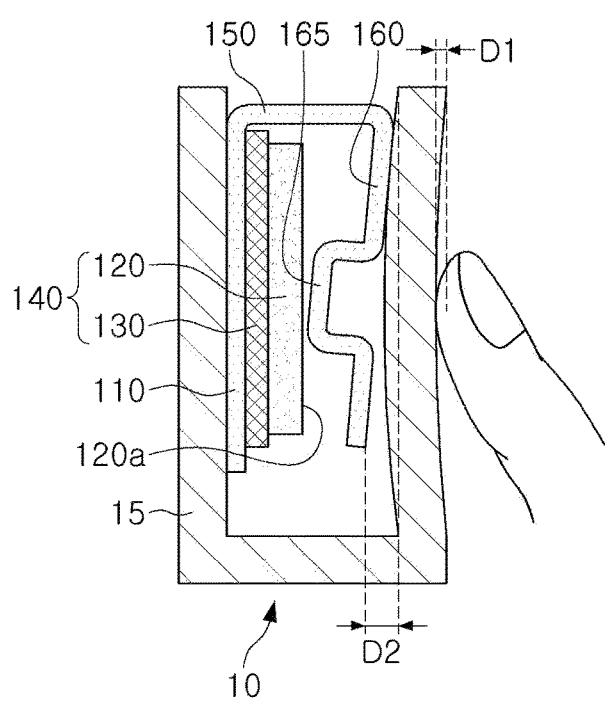
FIG. 5 is a view for explaining an operation of the electronic device shown in FIG. 4.

FIG. 4 is a cross-sectional view of the electronic device on which the force-sensing apparatus of FIG. 3 is mounted. FIG. 5 is a view for explaining an operation of the electronic device shown in FIG. 4. For the convenience of description, the electronic devices shown in FIGS. 4 and 5 show only the receiving member 10 in which the force-sensing apparatus 100 is accommodated.

The receiving member 10 of the present embodiment has an accommodation space in which the force-sensing apparatus 100 is accommodated. The accommodation space is formed as a space between a first sidewall 14 and a second sidewall 15 disposed to face the first sidewall 14.

The force-sensing apparatus 100 is inserted into the receiving member 10 provided in the electronic device along a direction P1 of FIG. 4.

When the force-sensing apparatus 100 is inserted into the receiving member 10, a second surface, which is an outer surface of the frame 110, contacts the second sidewall 15 of the receiving member 10, and an outer surface of the displacement portion 160 contacts the first sidewall 14 of the receiving member 10.

Accordingly, when a user applies pressure to the pressing surface (for example, the first sidewall) of the electronic device, the first sidewall 14 of the receiving member 10 is bowed as shown in FIG. 5, and the curved first sidewall 14 presses the displacement portion 160.

Since the displacement portion 160 of the present embodiment is connected to the support portion 150, the displacement portion 160 rotates about a portion connected to the support portion 150, and thus the protruding portion 165 of the displacement portion 160 becomes close to the force sensor 120.

As shown in FIG. 5, when a user applies pressure to the pressing surface of the electronic device, the first sidewall 14 of the receiving member 10 presses a portion, adjacent to the support portion (for example, a portion between the protruding portion and the support portion, not a center of the displacement portion 160.

Accordingly, since the displacement portion 160 rotates with respect to the support portion 150, the displacement of the displacement portion 160 increases longitudinally, along the displacement portion 160, at increasing distances away from the support portion 150.

For example, when a user causes the deformation of the first sidewall 14 by a distance of D1, an end portion of the displacement portion in which a protruding portion 165 is disposed moves by a distance of D2. Therefore, compared to the distance that the receiving member 10 moves based on user interaction, the relative moving distance of the displacement portion 160 may be greatly amplified.

Typically, when there is no displacement portion, the force sensor 120 may only sense a change in the distance from the first sidewall 14, which may only be a distance at which the first sidewall 14 deforms. Thus, in such a typical scenario, the sensing sensitivity may be lower than in the present embodiment in which the moving distance is amplified.

Meanwhile, in an embodiment, the force-sensing apparatus 100 may include at least one button 170.

The button 170 may be mounted on a connection portion 130, and may be used as an input device different from the force sensor 120.

The button 170 of the present embodiment may be a mechanically-operated push button. However, the present disclosure is not limited thereto, and various apparatuses may be used as long as it can detect various signals input externally, such as using a touch-type button or an input apparatus using a wheel.

The button 170 may penetrate the first sidewall 14 and be exposed to outside of the case of the electronic device. Accordingly, the user can directly operate the button 170 in contact with the connection portion 130. However, the present disclosure is not limited thereto, and may be configured to be disposed inside the receiving member.

The button 170 may be formed thicker than the force sensor 120. For example, the force-sensing apparatus 100 may be formed such that a first thickness T1 of a portion where the button 170 is mounted is equal to or greater than a second thickness T2 of a portion where the displacement portion 160 is disposed.

Here, the above-described first thickness T1 may be defined as a vertical distance from an outer surface of the frame 110 to an outer surface of the button 170. The second thickness T2 may be defined as a vertical distance from an outer surface of the frame 110 to an outer surface of the displacement portion 160.

When the first thickness T1 and the second thickness T2 are the same as each other, the button 170 may be disposed inside the receiving member 10, and the user may press the first sidewall 14 to operate the button 170. In addition, when the first thickness T1 is greater than the second thickness T2, the button 170 may penetrate the first sidewall 14 of the receiving member 10 and be exposed to the outside of the electronic device. In this case, the user can directly operate the button 170.

When the button 170 is provided as described above, an empty space may be formed between the force sensor 120 and the first sidewall 14 due to the size of the button 170. However, since the force-sensing apparatus 100, according to the present embodiment, is provided with the displacement portion 160 in the above-mentioned empty space, a portion where the force sensor 120 is disposed may also be inserted into the receiving member 10 without clearance.

The force-sensing apparatus, according to the embodiments of the present disclosure described above, is coupled to the electronic device in a manner that is inserted into the receiving member 10 provided in the electronic device. Therefore, it is very easy to be assembled and coupled.

In addition, the force-sensing device may be provided with a displacement portion 160 to amplify the change in distance between the force sensor 120 and the structure, thereby improving sensing sensitivity.

Meanwhile, the force-sensing apparatus according to the present disclosure is not limited to the above-described embodiment, and various applications are possible.

Figure 6:
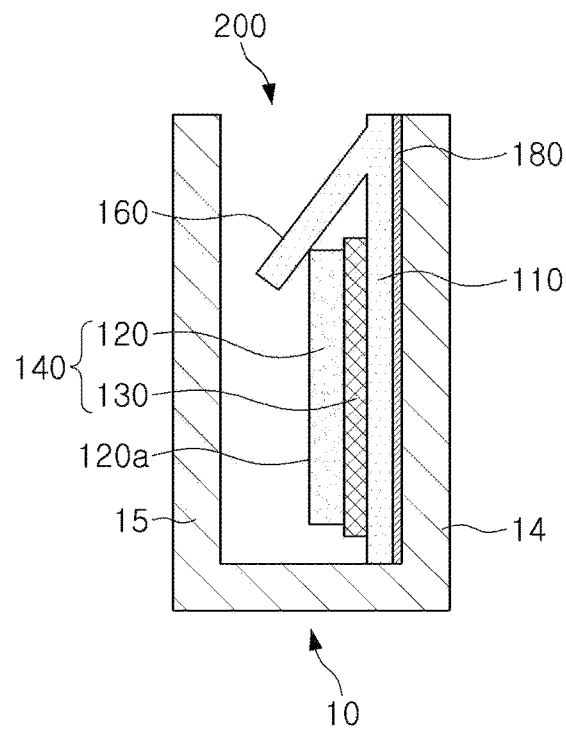
FIG. 6 is a cross-sectional view illustrating an electronic device according to another embodiment of the present disclosure.
Figure 7:
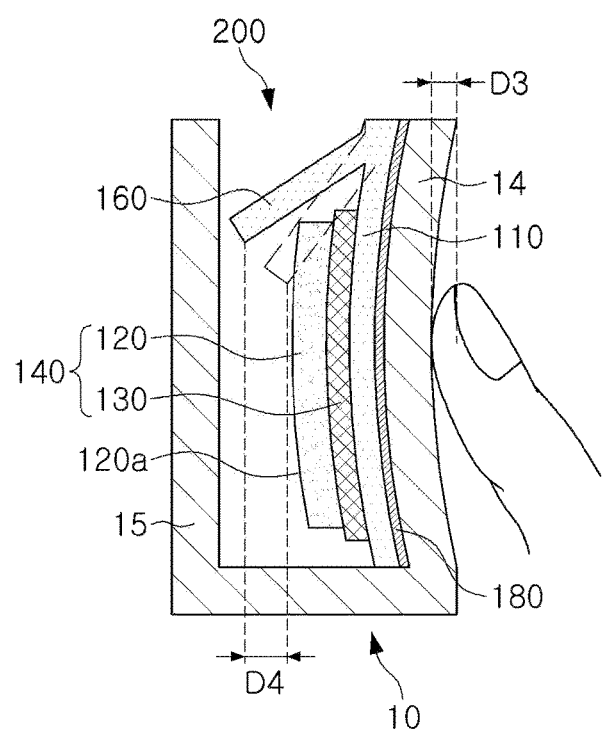
FIG. 7 is a view for explaining an operation of the electronic device shown in FIG. 6.

FIG. 6 is a cross-sectional view illustrating an electronic device according to another embodiment of the present disclosure. FIG. 7 is a view for explaining an operation of the electronic device shown in FIG. 6. FIGS. 6 and 7 illustrate a force-sensing apparatus coupled to a receiving member, and in the case of the force-sensing apparatus, a cross-section corresponding to I-I' of FIG. 1 is shown.

In FIGS. 6 and 7, a force-sensing apparatus 200, according to the present embodiment, does not include a support portion 150 and a displacement portion 160 is directly coupled to the frame 110.

In addition, the displacement portion 160 of the present embodiment is formed in a flat plate shape and is not disposed parallel to the sensing surface 120a of the force sensor 120 or the frame 110. The displacement portion 160 is coupled to the frame 110 in an inclined form forming an acute angle as illustrated in FIG. 6. Accordingly, one side of the displacement portion 160 is coupled to an upper end side of the frame 110, and is disposed in a form away from the frame 110 toward the other side. At least a portion of the displacement portion 160 is disposed in front of the sensing surface 120a of the force sensor 120.

In addition, the displacement portion 160 is disposed such that a portion of one surface disposed to face the frame 110 contacts the force sensor 120. In an example, the force sensor 120 may be disposed such that one side edge of the sensing surface 120a disposed closest to the displacement portion 160 supports one surface of the displacement portion 160. In this case, the force sensor 120 may only in contact with the displacement portion 160, but may not be bonded to each other.

To this end, the displacement portion 160 of the present embodiment may be resiliently deformed and may be spaced apart from the frame 110, and can maintain a state in contact with the force sensor 120 through restorative force according to the resilient deformation. However, it is not limited thereto.

In the force-sensing apparatus 100 of the present embodiment configured as described above, the frame 110 is coupled to the first sidewall 14 of the receiving member 10 to which pressure is applied by a user.

In an example, the entire outer surface of the frame 110 may be bonded to the first sidewall 14. Accordingly, when a user applies pressure to the first sidewall 14, as shown in FIG. 7, the frame 110 and the force sensor 120 coupled to the frame 110 may be bowed together with the first sidewall 14 and may be deformed.

As illustrated in FIG. 7, the first sidewall 14 and the frame 110 may be deformed into an arc shape by a user's force.

Due to the deformation of the frame 110, the displacement portion 160 fastened to an upper end of the frame 110 has an end portion rotated away from the sensing surface 120a of the force sensor 120. In this case, since the displacement portion 160 rotates by a certain portion corresponding to a degree to which an upper end of the frame 110 is bowed, the displacement is greater as a portion disposed farther of the rotary shaft.

Therefore, in the force-sensing apparatus 200 of the present embodiment, when a user deforms the first sidewall 14 by a distance of D3, an end portion of the displacement portion 160 moves by a distance of D4. Accordingly, a moving distance of the displacement portion 160 may be greatly amplified compared to the distance by which the user deforms the receiving member 10.

In the force-sensing apparatus 200 of the present embodiment, the frame 110 may be firmly attached to the first sidewall 14, and the displacement portion 160 may be disposed to be spaced apart by a predetermined distance from the second sidewall 15. Therefore, a bonding member 180 such as an adhesive tape or an adhesive may be interposed between the frame 110 and the first sidewall 14.

Figure 8:
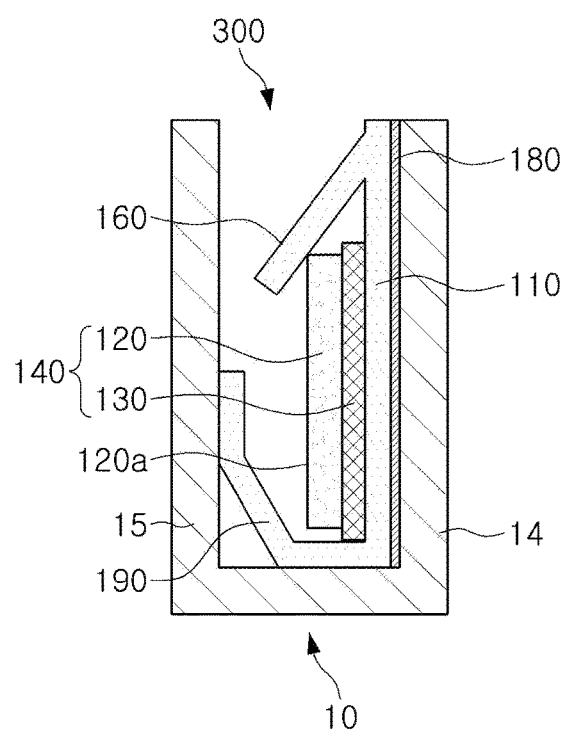
FIG. 8 is a cross-sectional view illustrating an electronic device according to another embodiment of the present disclosure.

FIG. 8 is a cross-sectional view showing an electronic device according to another embodiment of the present disclosure. FIG. 8 illustrates a force-sensing apparatus coupled to a receiving member, and illustrates a cross-section corresponding to I-I' of FIG. 1 in the case of the force-sensing apparatus.

In FIG. 8, a force-sensing apparatus 300 of the present embodiment is configured similarly to the force-sensing apparatus 200 illustrated in FIG. 6, and may further include a resilient member 190.

The resilient member 190 may be disposed between the frame 110 and the second sidewall 15 to press the frame 110 toward the first sidewall 14. Accordingly, the frame 110 may be kept in close contact with the first sidewall 14.

In the present embodiment, a plate spring in the form of a cantilever may be used as the resilient member 190. In addition, the resilient member 190 of the present embodiment may be formed by partially bending a material constituting the frame 110. Therefore, the resilient member 190 may be integrally formed with the frame 110.

However, the present disclosure is not limited thereto, and after the resilient member 190 is provided separately from the frame 110, various modifications are possible, such as interposing the resilient member 190 between the frame 110 and the second sidewall 15. In this case, a resilient body such as a coil spring, rubber, or foam rubber may be used as the resilient member 190.

The resilient member 190 of the present embodiment may be disposed in a region of the frame 110 where the force sensor 120 is disposed, but the configuration of the present disclosure is not limited thereto. For example, the resilient member 190 may be disposed in a region of the frame 110 where the force sensor 120 is not disposed, that is, between the force sensors 120.

As set forth above, according to an embodiment of the present disclosure, a displacement portion may be provided to amplify a distance change between the force sensor and the structure, thereby improving sensing sensitivity.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A force-sensing apparatus, comprising:
a planar-shaped frame;
a force sensor disposed on one surface of the frame; and
a displacement portion having a planar profile and one side coupled at an acute angle to the frame to resiliently deform based on applied external pressure and another side freely disposed above a sensing surface of the force sensor.

2. The force-sensing apparatus of claim 1, wherein the frame and the force sensor are bowed and deformed by pressure applied externally.

3. The force-sensing apparatus of claim 2, wherein in the displacement portion, a portion of the one surface of the frame contacts the force sensor.

4. The force-sensing apparatus of claim 3, wherein the displacement portion maintains a state in contact with the force sensor through restorative force caused by resilient deformation.

5. The force-sensing apparatus of claim 3, wherein the displacement portion contacts an edge of the sensing surface of the force sensor.

6. The force-sensing apparatus of claim 1, further comprising a circuit board disposed on the one surface of the frame,
wherein each of a plurality of force sensors is disposed to be spaced apart and mounted on the circuit board.

7. The force-sensing apparatus of claim 1, wherein the force-sensing apparatus is included in an electronic device.

8. An electronic device, comprising:
a receiving member having a first sidewall and a second sidewall disposed to face the first sidewall; and
a force-sensing apparatus inserted into the receiving member, and the force-sensing apparatus comprising:
a frame having one surface bonded to the first sidewall;
a force sensor disposed on another surface of the frame; and
a displacement portion connected to the frame, and, having a portion thereof disposed above a sensing surface of the force sensor,
wherein the frame and the first sidewall are configured to resiliently deform based on applied external pressure.

9. The electronic device of claim 8, further comprising an adhesive member disposed between the frame and the first sidewall.

10. The electronic device of claim 8, wherein one side of the displacement portion is connected at an acute angle to the frame and the portion disposed above the sensing surface contacts the force sensor.

11. The electronic device of claim 8, wherein the force-sensing apparatus is disposed to be spaced apart from the second sidewall.

12. The electronic device of claim 8, wherein the force-sensing apparatus further comprises a resilient member disposed between the second sidewall and the frame, and biasing the frame toward the first sidewall.

13. The electronic device of claim 8, wherein the electronic device is a mobile device.

14. A force-sensing apparatus, comprising:
a frame formed of a planer-shaped member;
a force sensor disposed on a surface of the frame;
a displacement portion having a portion disposed above a sensing surface of the force sensor; and
a button member, disposed on the surface of the frame, spaced apart from the displacement portion,
wherein a vertical distance from an outer surface of the frame to an outer surface of the button member is equal to or greater than a vertical distance from the outer surface of the frame to the outer surface of the displacement portion, and
the button member is operable by a user.

15. The force sensing apparatus of claim 14, wherein the displacement portion is resiliently deformed by external pressure.

16. The force sensing apparatus of claim 14, wherein the displacement portion is disposed in parallel with the frame.

17. The force sensing apparatus of claim 16, further comprising a support portion connecting the displacement portion and the frame.

18. The force sensing apparatus of claim 14, wherein the displacement portion comprises a protruding portion protruding toward the force sensor.

19. The force-sensing apparatus of claim 14, wherein the force-sensing apparatus is included in an electronic device.

20. The force-sensing apparatus of claim 19, wherein the electronic device is a mobile device.

* * * * *